(12) United States Patent
Lien et al.

(10) Patent No.: US 8,152,380 B2
(45) Date of Patent: Apr. 10, 2012

(54) SLEEVE BEARING ASSEMBLY AND METHOD OF CONSTRUCTION

(75) Inventors: Gerald Thomas Lien, Exton, PA (US); Cassie Marie Malloy, Blue Bell, PA (US); Ramesh R. Avula, Phoenixville, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 930 days.

(21) Appl. No.: 11/769,354

(22) Filed: Jun. 27, 2007

(65) Prior Publication Data

US 2008/0006062 A1 Jan. 10, 2008

Related U.S. Application Data

(60) Provisional application No. 60/819,320, filed on Jul. 7, 2006, provisional application No. 60/871,669, filed on Dec. 22, 2006.

(51) Int. Cl.
*F16C 33/18* (2006.01)
*D03D 23/00* (2006.01)

(52) U.S. Cl. ........................ 384/298; 139/383 A

(58) Field of Classification Search .......... 384/206, 384/291–292, 297–298, 300; 139/383, 386, 139/452, 452 A; 400/193, 400; 29/898.06, 29/898.046, 898.049, 898.054, 898.15; 442/158, 442/211–213; 428/175, 178
See application file for complete search history.

(56) References Cited

U.S. PATENT DOCUMENTS

| | | | |
|---|---|---|---|
| 2,128,087 A * | 8/1938 | Gatke | ........................... 384/298 |
| 3,033,623 A | 5/1962 | Thomson | |
| 3,068,053 A | 12/1962 | Runton et al. | |
| 3,097,060 A | 7/1963 | Sullivan, Jr. | |
| 3,110,530 A | 11/1963 | Herman | |
| 3,328,100 A | 6/1967 | Spokes et al. | |
| 3,616,000 A | 10/1971 | Butzow et al. | |
| 3,692,375 A | 9/1972 | Matt et al. | |
| 3,804,479 A | 4/1974 | Butzow et al. | |
| 3,806,216 A | 4/1974 | Orkin et al. | |
| 3,929,396 A | 12/1975 | Orkin et al. | |
| 3,950,599 A | 4/1976 | Board, Jr. | |
| 4,048,370 A | 9/1977 | Orkin et al. | |
| 4,107,381 A | 8/1978 | Butzow et al. | |
| 4,134,842 A | 1/1979 | Orkin et al. | |
| 4,174,739 A * | 11/1979 | Rasero et al. | ................. 139/388 |

(Continued)

FOREIGN PATENT DOCUMENTS

JP 01093619 A 4/1989

(Continued)

*Primary Examiner* — Marcus Charles

(74) *Attorney, Agent, or Firm* — Robert L. Stearns; Dickinson Wright, PLLC

(57) ABSTRACT

A sleeve bearing assembly and method of construction therefor includes a woven inner portion bonded to an injection molded elastic outer portion. The inner portion includes a first yarn of lubricious yarn material and a second yarn of material that is different than the first yarn. The first yarn substantially provides an inner bearing surface and the second yarn substantially provides an outer surface that is bonded to the outer portion. The first and second yarns are woven together so that the first yarn is woven in one of a weft direction corresponding to a circumferential direction of the journal bearing surface or a warp direction corresponding to an axial direction of the journal bearing surface to substantially provide the bearing surface and the second yarn is woven in a direction different than the first yarn to substantially provide the outer surface bonded to the outer portion.

13 Claims, 4 Drawing Sheets

U.S. PATENT DOCUMENTS

| | | | |
|---|---|---|---|
| 4,189,985 A | 2/1980 | Harris | |
| 4,358,167 A | 11/1982 | Magazian et al. | |
| 4,369,818 A | 1/1983 | Yoshida | |
| 4,717,268 A | 1/1988 | Orkin | |
| 4,842,424 A | 6/1989 | Narkon et al. | |
| 4,916,749 A | 4/1990 | Urban et al. | |
| 4,976,550 A | 12/1990 | Shobert | |
| 5,137,374 A | 8/1992 | Orkin | |
| 5,373,637 A | 12/1994 | Harris et al. | |
| 5,417,499 A | 5/1995 | Jacques et al. | |
| 5,431,500 A | 7/1995 | Harris et al. | |
| 5,685,648 A | 11/1997 | Harris et al. | |
| 5,843,542 A * | 12/1998 | Brushafer et al. | 442/208 |
| 6,239,049 B1 * | 5/2001 | Follensbee et al. | 442/158 |
| 6,328,080 B1 * | 12/2001 | Winters | 139/388 |
| 6,581,645 B1 * | 6/2003 | Johnson et al. | 139/383 A |
| 6,950,599 B2 | 9/2005 | Nicholls et al. | |
| 7,121,306 B2 * | 10/2006 | Harrison | 139/440 |
| 7,188,642 B2 | 3/2007 | James et al. | |
| 7,216,678 B2 * | 5/2007 | Baer | 139/390 |
| 2003/0035602 A1 | 2/2003 | Shobert et al. | |
| 2003/0190853 A1 * | 10/2003 | Lovingood | 442/209 |
| 2004/0152551 A1 * | 8/2004 | Okuno et al. | 474/263 |
| 2004/0213492 A1 | 10/2004 | Kim et al. | |
| 2005/0085147 A1 * | 4/2005 | Homma et al. | 442/218 |
| 2005/0186367 A1 | 8/2005 | Hanrhan | |
| 2006/0016507 A1 * | 1/2006 | Baer | 139/383 R |
| 2006/0054346 A1 | 3/2006 | Gladfelter et al. | |
| 2006/0134389 A1 * | 6/2006 | Weiser | 428/178 |
| 2007/0190879 A1 | 8/2007 | Gondoh et al. | |

FOREIGN PATENT DOCUMENTS

| | | |
|---|---|---|
| JP | 403152237 | 6/1991 |
| JP | 403292198 | 12/1991 |

* cited by examiner

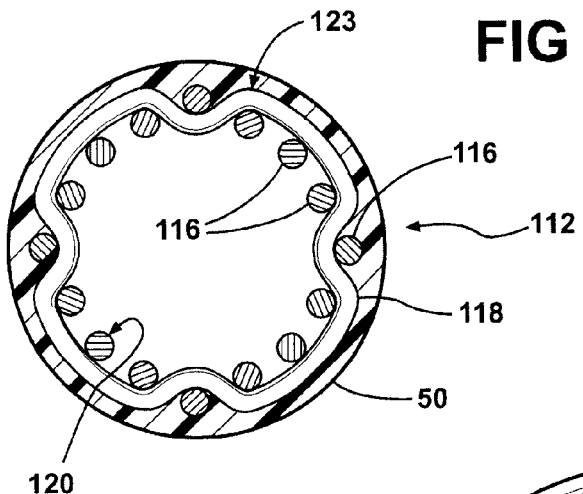
FIG - 5
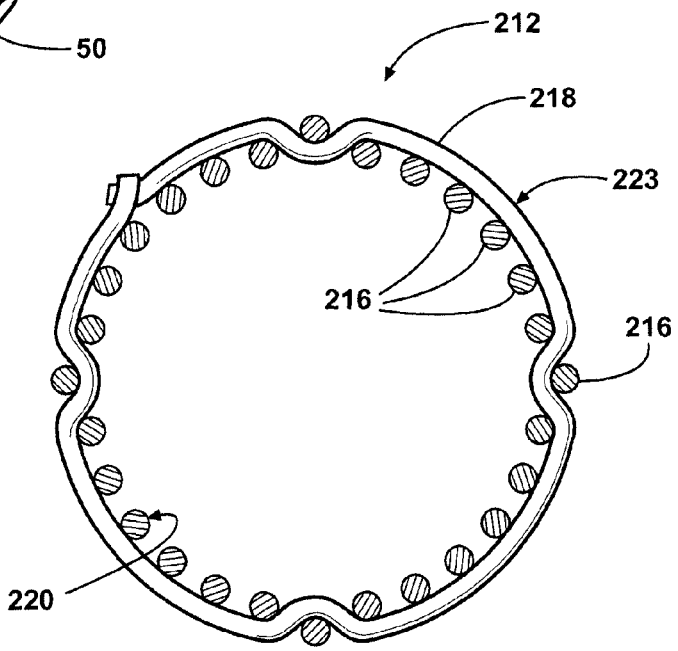
FIG - 6
FIG - 7
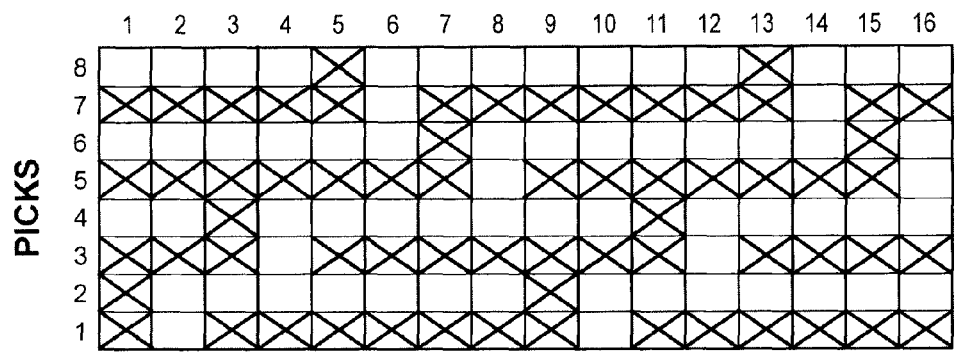

SLEEVE BEARING ASSEMBLY AND METHOD OF CONSTRUCTION

CROSS-REFERENCE TO RELATED APPLICATIONS

This application claims priority to U.S. Provisional Application Ser. No. 60/819,320, filed Jul. 7, 2006, and also to U.S. Provisional Application Ser. No. 60/871,669, filed Dec. 22, 2006, which are both incorporated herein by reference in their entirety.

BACKGROUND OF THE INVENTION

1. Technical Field

This invention relates generally to sleeve bearings, and more particularly to sleeve bearing assemblies having a self-lubricating inner journal bearing portion and an outer elastomeric portion for dampening shock loads, such as for use in a suspension system of a vehicle.

2. Related Art

Vehicle suspension components work together to serve a variety of functions, such as maintain proper ride height, maintain wheel alignment, support vehicle weight, maintain the tires in contact with the ground surface, control the vehicle direction of travel, and provide a smooth ride by dampening shock loads. Some of the components are coupled together via sleeve bearings to allow relative movement therebetween. Commonly, the sleeve bearings are fabricated having an outer portion constructed of rubber or urethane and an inner portion constructed of lubricious journal bearing material. The outer portion provides the dampening characteristics desired, while the inner portion reduces friction between the coupled components to allow the relative movement therebetween in use.

It is known to construct sleeve bearing assemblies, such as those described above, by knitting the inner portion first and injection molding the outer portion about the inner portion. The inner portion is known to be knitted from yarn compositions comprising a lubricious yarn material, such as polytetrafluoroethylene (PTFE) fibers, and a structural yarn material, such as polyester fibers. The two yarns are knitted together such that the PTFE follows the pattern of the polyester. Upon knitting the inner portion, it is stretched over an oversized mandrel to remove circumferential slack from the fabric and then located in a mold cavity, whereupon the outer portion is injection molded about the inner portion.

Although sleeve bearing assemblies constructed in accordance with the process described above can be generally effective in use, some improvements can be achieved. For example, the knitted sleeve bearing assemblies utilize an inefficient amount of PTFE in manufacture, given the PTFE follows the knitted pattern of the polyester. As a result, it has been determined that about three turns of PTFE are used in every revolution, and thus, only about 30 percent of the PTFE is actually required to provide a bearing surface, while the remaining 70 percent of the PTFE yarn is not necessary for use as a bearing surface. This ultimately results in cost inefficiencies, given the PTFE is generally the most expensive fiber in the sleeve. Further, the resulting knitted inner portion typically allows the injected molten rubber to penetrate through the knitted yarns and into the bearing surface region of the sleeve. This occurs in part due to the need to stretch the fabric over the mandrel to remove slack from the fabric and because the knitted yarns do not provide a structure tight enough to prevent the rubber from penetrating therethrough. As such, the overall friction reducing effectiveness of the sleeve is reduced. In addition, while performing the injection molding of rubber in the known knitted sleeves, the rubber bonding to the outer surface of the knitted portion can cause the knitted portion to stretch further circumferentially, thereby causing a crease to form in the knitted portion. When this occurs, the resulting product is scrap. Lastly, during the injection molding process, the mandrel becomes increasingly hotter from being exposed to the heat from the molten rubber, thereby presenting an assembly challenge to the operator stretching the inner portion over the mandrel. As such, the operator commonly wears heat resistant gloves, thus, complicating the job.

A sleeve bearing assembly manufactured according to the present invention overcomes or greatly minimizes any limitations of the prior art, such as those described above, for example.

SUMMARY OF THE INVENTION

A sleeve bearing assembly has an inner portion constructed from a plurality of separate yarns to provide a generally cylindrical inner journal bearing surface for receipt of a journal for relative movement therein and for engagement therewith. The yarns include a first yarn of lubricious yarn material and a second yarn of material that is different than the first yarn. The first yarn substantially provides the inner bearing surface and the second yarn substantially provides an outer surface of the inner portion. The bearing assembly further has an elastic outer portion injection molded at least partially about the inner portion and bonded with the outer surface. The first and second yarns are woven together. The first yarn is woven in one of a weft direction corresponding to a circumferential direction of the journal bearing surface or a warp direction corresponding to an axial direction of the journal bearing surface to substantially provide the bearing surface. The second yarn is woven in a direction different than the first yarn to substantially provide the outer surface.

In accordance with another aspect of the invention, a method of constructing a sleeve bearing assembly having a generally cylindrical inner portion with a journal bearing surface and an elastomeric outer portion extending at least partially about the inner portion is provided. The method includes constructing the inner portion on a loom by weaving a plurality of first and second yarns together to form the journal bearing surface with the first yarns being provided as a lubricious yarn and being woven in one of a weft direction corresponding to a circumferential direction of the journal bearing surface or a warp direction corresponding to an axial direction of the journal bearing surface. The method further includes weaving the second yarns in a direction different than the first yarns, and then disposing the woven inner portion in a mold cavity. Further, the method includes molding the outer portion with an elastomeric material at least partially about the inner portion so that the outer portion bonds to the inner portion.

A sleeve bearing assembly manufactured in accordance with the present invention provides a uniform self-lubricating bearing surface, reduces friction relative to a journal received therein, provides a substantially continuous self-lubricating bearing surface, reduces the potential for scrap in manufacture, increases manufacturing efficiencies, reduces the overall cost associated with manufacturing the assembly, minimizes the use of expensive bearing surface materials, maximizes the percentage of total bearing surface material in contact with the journal, minimizes the use of yarn in construction of the inner portion, increases manufacturing efficiencies and reduces labor complexities, and increases the useful life of the sleeve bearing assembly.

BRIEF DESCRIPTION OF THE DRAWINGS

These and other objects, features and advantages will become readily apparent to those skilled in the art in view of the following detailed description of the presently preferred embodiments and best mode, appended claims, and accompanying drawings, in which:

FIG. 5 is a schematic cross-sectional view of a woven inner portion constructed in accordance with another presently preferred embodiment with a coating applied thereon;

FIG. 6 is a schematic cross-sectional view of a woven inner portion constructed in accordance with yet another presently preferred embodiment; and FIG. 7 a chart showing the weave pattern of the woven inner portion of FIG. 6.

DETAILED DESCRIPTION OF PREFERRED EMBODIMENTS

Figure 1:
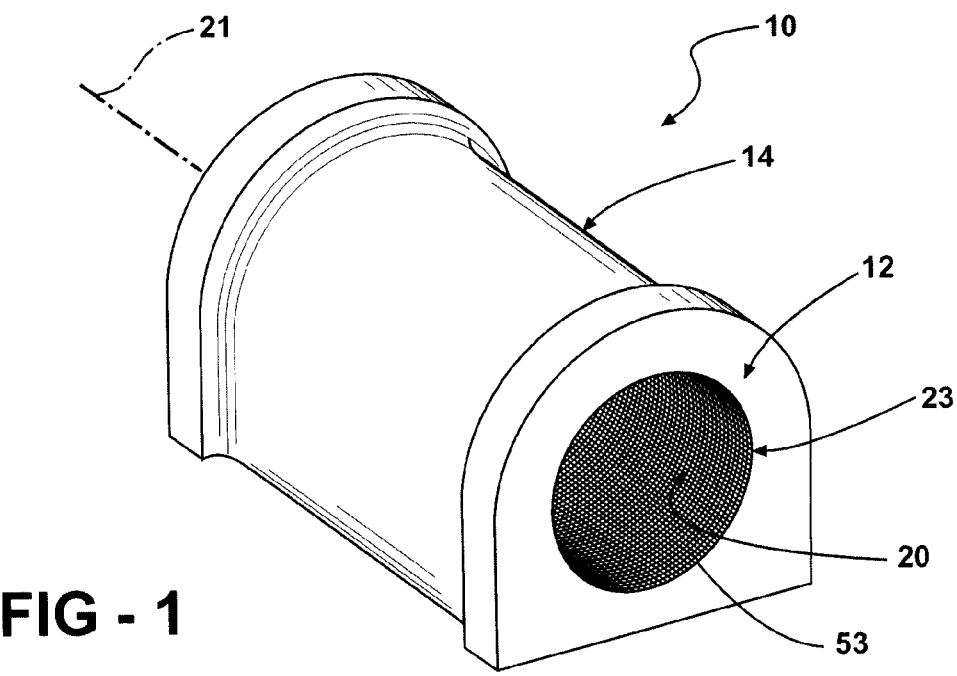
FIG. 1 is a schematic perspective view of a sleeve bearing assembly constructed in accordance with one presently preferred embodiment of the invention.

Referring in more detail to the drawings, FIG. 1 shows a sleeve bearing assembly 10 constructed according to one presently preferred embodiment of the invention. The sleeve bearing assembly 10 is particularly useful for applications requiring dampening and reduced friction support between members coupled to one another (not shown), such as in an anti-roll bar, a control arm, or other suspension locations within a suspension system of a vehicle, for example. The sleeve bearing assembly 10 has an inner portion 12 (FIG. 2) constructed from tightly woven yarns and an outer portion 14 that is injection molded at least partially about the inner portion 12. The outer portion 14 is formed from any suitable injection moldable dampening material, such as rubber or urethane compounds, for example, that adheres or bonds to the inner portion 12. The inner portion 12 is woven from a first multifilament yarn 16, such as polyester, or PET filaments, preferably textured, or some other fiber exhibiting high loft with an affinity for adhering or bonding to the elastomeric material forming the outer portion 14 and a second multifilament yarn 18, such as PTFE filaments (Teflon), polyoxymethalyne, or other materials exhibiting a low coefficient of friction. The PET yarn 16 primarily serves a structural function, such as by facilitating the bonding of the inner portion 12 to the outer portion 14, and acting to prevent the molten elastomeric material of the outer portion 14 from penetrating into the PTFE yarn 18. The PTFE yarn 18 provides a self-lubricating inner bearing surface 20 (FIGS. 1 and 2) to minimize friction against a journal surface (not shown). Accordingly, the sleeve bearing assembly 10 is able to both reliably dampen vibration and forces via the outer portion 14, while also minimizing friction between a journal surface and the bearing surface 20 via the inner portion 12.

Figure 2:
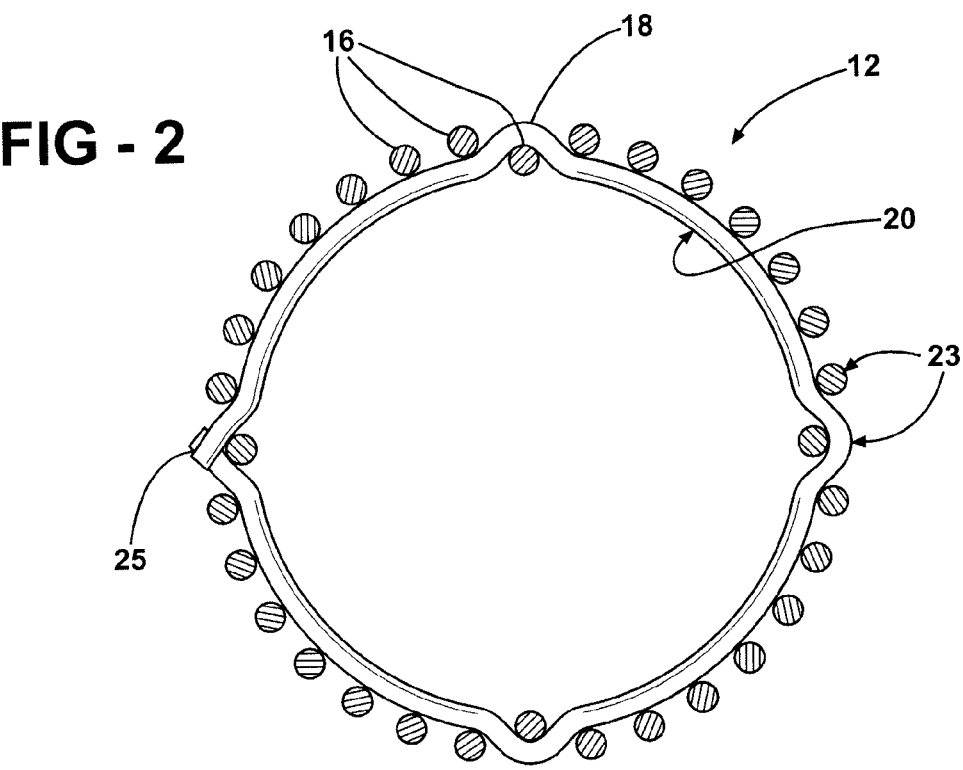
FIGS. 2 is a schematic cross-sectional view of a woven inner portion of the sleeve bearing assembly according to one presently preferred embodiment.
Figure 3:
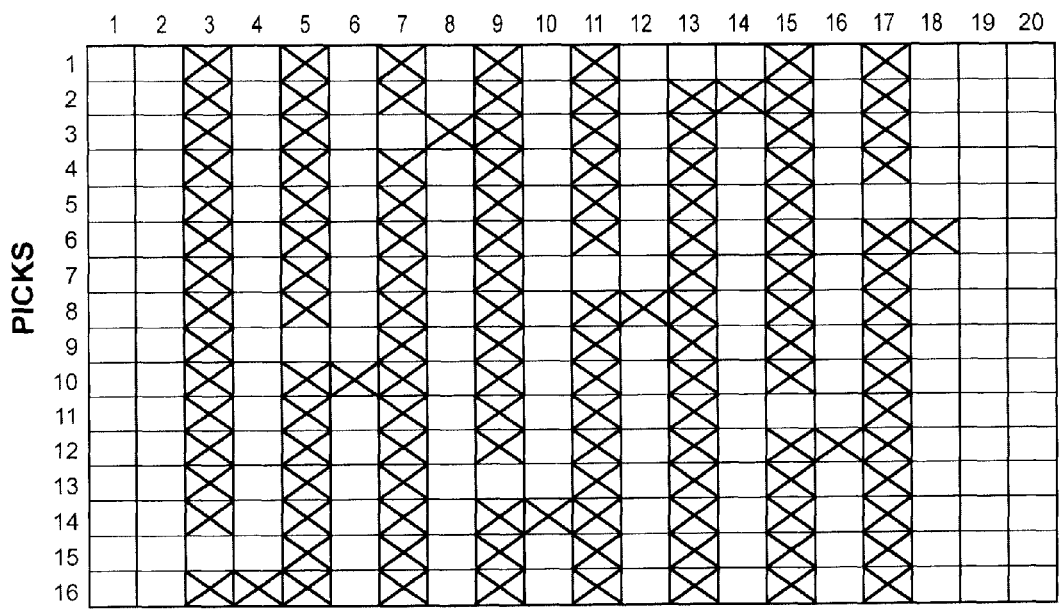
FIGS. 3 is chart showing the weave pattern of the inner portion.
Figure 4:
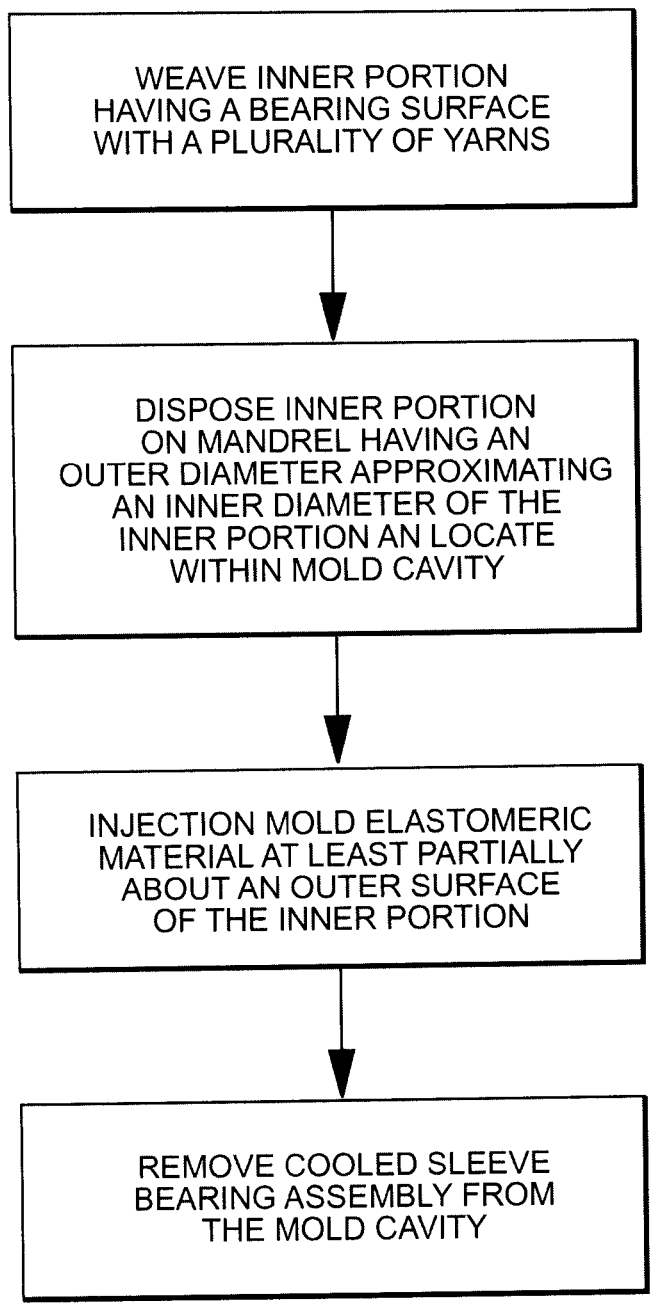
FIG. 4 is a diagrammatic chart showing a method of constructing the sleeve bearing assembly.

As best shown in FIG. 2, one presently preferred embodiment of the inner portion 12 is woven from the first and second yarns 16, 18 of PET and PTFE, respectively. The weave pattern is represented diagrammatically in FIG. 3. The yarns 16, 18 can be woven on a variety of looms, such as on a Jacob Müeller narrow fabric needle loom, for example. The PET yarn 16 is woven in a warp direction (in and out of the paper as viewed in FIG. 2) corresponding to an axial direction 21 (FIG. 1) of the assembly 10, while the PTFE yarn 18 is woven in the weft direction corresponding to a circumferential direction about the axis 21. The pair or yarns 16, 18 are woven such that the PET yarn 16 forms an outer surface 23 of the inner portion 12 and the PTFE yarn 18 forms the bearing surface 20. As mentioned, the PET yarn 16 acts primarily as a structural support or carrier for the PTFE yarn 18, and to provide a barrier to the molten elastomeric material into the bearing surface region during the injection molding process (FIG. 4). The PTFE yarn 18 is woven with the PET yarn 16 in a satin weft-faced weave. Accordingly, both the PET yarn 16 and the PTFE yarn 18 are presented with a satin weave finish. In the example shown here, the PTFE yarn 18 is woven in a 7:1 satin weave pattern, as shown in FIG. 2, though it could be different, if desired. Accordingly, the bearing surface 20 is comprised entirely of the lubricious PTFE yarn 18, with the exception of the occasional single overlays of the PET yarn 16. As such, it is estimated that the bearing surface is comprised of about 80-85 percent of the PTFE yarn 18, thereby minimizing the static and dynamic coefficient of friction relative to the journal. The tubular weaving process on the narrow fabric needle loom provides a stitched seam 25 that extends along the length of the inner portion 12.

The PET warp yarn 16 is generally provided having a denier between about 200-1000, and is shown here as being about 600 denier. As such, the PET yarn 16 forms a compact, tight weave (individual yarns shown schematically in an expanded relation to one another for clarity), such that the yarn 16 is desirably maintained toward the outer surface 23 and thus, away from the bearing surface 20. In addition, the relatively small denier, which lends to the tight weave pattern, contributes to the prevention of the molten elastomeric material of the outer portion 14 from penetrating through the outer surface 23 during the injection molding process.

As shown in FIG. 4, upon weaving the inner portion 12, the remaining operations are performed to construct the sleeve bearing assembly 10. The resulting inner portion 12 is preferably disposed on a mandrel of suitable size, preferably having an outer diameter approximating an inner diameter of the inner portion 12, and then located with a mold cavity of an injection mold machine. As such, the effort to place the inner portion 12 on the mandrel is minimized, given the inner portion is not stretched significantly in a circumferential direction. The outer portion 14 is then formed by injecting the desired elastic material, such as rubber, under pressure into the mold cavity and at least partially about an outer surface 23 of the inner portion 12. The outer portion 14 is allowed to cool to a predetermined temperature and/or for a predetermined amount of time, and then the resulting sleeve bearing assembly 10 is removed from the mold cavity.

With the inner portion 12 being woven, as described above, the weave pattern presents the PTFE weft yarns 18 in a circumferential direction about the inner portion 12. As such, the weft yarns 18 provide the inner portion 12 with a relatively high hoop strength, thereby eliminating the aforementioned problem of forming a crease in the inner portion 12 during the injection molding process. Accordingly, the production of scrap is minimized. In addition, the increased hoop strength of the inner portion 12 increases the rigidity and integrity of the bearing surface 20, thereby maximizing its useful life under load.

As shown in FIG. 5, another presently preferred construction of an inner portion 112 is shown wherein the inner portion 112 is constructed at least in part from material that bonds well with the rubber outer layer 10, as described above, oriented in the weft direction, such as PET weft yarns 118, for example. In this embodiment, the warp yarns are woven with lubricious warp yarns 116, such as PTFE yarns, for example. The weft yarns 118 are woven here, by way of example and without limitation, so that they extend over 3 warp yarns 116 to provide an outer surface 123 of the inner portion 112, though they could extend over more warp yarns, if preferred for the intended application. For example, as shown in FIGS. 6 and 7, yet another presently preferred construction of an inner portion 212 has circumferentially directed weft yarns 218 shown floating over 7 lubricious axially extending warp yarns 216.

The lubricious warp yarns 116, 216 can be woven in either a twill or satin warp-faced pattern, with the floats being formed to provide inner bearing surfaces 120, 220 of the inner portions 112, 212. The lubricious inner surfaces 120, 220 provide contact with the shaft or journal (not shown) with it being believed that the warp-faced satin weave of the yarns 116, 216 provides more lubricity to the inner bearing surfaces 120, 220. Having the lubricious warp yarns 116, 216 extending along the length of the inner portions 112, 212 ensures that if the woven fabric were to encounter some end fray, which is generally caused by the weft or fill yarns falling out of the warp yarns at an end, then it would be the PET weft yarns 118, 218 being removed, and not the lubricious warp yarns 116. In addition, with the weft yarns 118, 218 being molded and bonded to the outer portion 14 described above, assurance is provided that the weft yarns 118, 218 are locked or fixed in place, thereby preventing an end fray condition from occurring. With the weft yarns 118, 218 being locked in place, the lubricious warp yarns 116, 216 are also locked in place between the weft yarns 118, 218 and the shaft extending through the inner portions 112, 212.

To further yet provide assurance against an end fray condition from occurring, a bonding agent or adhesive layer 50 (FIG. 5) can be applied to the woven fabric of the inner portions 12, 112, 212, particularly at the axially opposite ends 53 (FIG. 1) of the inner portions 12, 112, 212. The adhesive layer 50 can be applied in a variety of ways, such as in a spraying or coating process, for example. The adhesive layer 50 can be provided as a single or multi-coat rubber-based aqueous adhesive, by way of example and without limitation, such as nitrile rubber or silicone rubber, for example. It should be recognized that other bonding agents are contemplated herein, and the aforementioned bonding agents represent only some possible selections. The adhesive layer 50 also facilitates bonding between the woven fabric substrate and the natural rubber or styrene butadiene rubber outer layer 14. The adhesive layer 50 is preferably applied to the desired portions of the outer surfaces 23, 123, 223 after being woven via a dip/saturation process, or spray coating application, for example. The adhesive layer 50 can be cured by hot air, for example, to facilitate the curing process. As mentioned, the adhesive layer 50 coating not only minimizes the further potential for end fray, but it also promotes a strong and reliable bond between the inner portions 12, 112, 212 and the outer portion 14 during molding.

It is to be understood that other embodiments of the invention which accomplish the same function are incorporated herein within the scope of this invention. It is also to be understood that sleeve assemblies can be manufactured in a variety of shapes, sizes and diameters, such as by altering the number of warp yarns 16 incorporated into the weave. In addition, the sleeve bearing assemblies can be utilized in a variety applications and industries other than those mentioned above. The invention is defined by the claims that issue from this application and any related applications.

What is claimed is:

1. A sleeve bearing assembly, comprising:
    an inner portion constructed from a plurality of separate yarns to provide a generally cylindrical journal bearing surface for receipt of a journal for relative movement therein and for engagement therewith, said yarns including a first yarn of lubricious yarn material and a second yarn of material different than said first yarn, said second yarn substantially providing an outer surface of said inner portion;
    an elastic outer portion injection molded at least partially about said inner portion and being bonded with said outer surface; and
    said first and second yarns being woven together with said first yarn being woven in one of a weft direction corresponding to a circumferential direction of said journal bearing surface or a warp direction corresponding to an axial direction of said journal bearing surface to substantially provide said bearing surface and said second yarn being woven in a direction different than said first yarn.

2. The sleeve bearing assembly of claim 1 wherein said first yarn is woven in said weft direction to form said bearing surface.

3. The sleeve bearing assembly of claim 2 wherein said first yarn is woven in a weft-faced satin weave.

4. The sleeve bearing assembly of claim 2 wherein said second yarn is a polyester material woven in said warp direction.

5. The sleeve bearing assembly of claim 4 wherein said second yarn is between about 200 and 1000 denier.

6. The sleeve bearing assembly of claim 1 wherein said first yarn is PTFE.

7. The sleeve bearing assembly of claim 1 wherein said first yarn is woven said warp direction.

8. The sleeve bearing assembly of claim 7 wherein said first yarn is woven in a satin warp-faced weave.

9. The sleeve bearing assembly of claim 7 wherein said first yarn is woven in a twill weave.

10. The sleeve bearing assembly of claim 7 wherein said second yarn is woven in said weft direction.

11. The sleeve bearing assembly of claim 10 wherein said second yarn is polyester.

12. The sleeve bearing assembly of claim 1 further including an adhesive layer bonded to said outer surface of said inner portion.

13. The sleeve bearing assembly of claim 12 wherein said adhesive layer is a rubber-based material.

* * * * *